United States Patent [19]
Nakano et al.

[11] Patent Number: 5,542,890
[45] Date of Patent: Aug. 6, 1996

[54] TOROIDAL STEPLESS TRANSMISSION

[75] Inventors: Masaki Nakano; Toshikazu Oshidari, both of Kanagawa, Japan

[73] Assignee: Nissan Motor Co., Ltd., Yokohama, Japan

[21] Appl. No.: 358,951

[22] Filed: Dec. 19, 1994

[30] Foreign Application Priority Data

Dec. 24, 1993 [JP] Japan ................................. 5-347924

[51] Int. Cl.⁶ ................................................. F16H 15/38
[52] U.S. Cl. .............................. 476/10; 74/411; 475/214; 476/42
[58] Field of Search ................................. 475/214, 215; 476/10, 40, 42; 74/411

[56] References Cited

U.S. PATENT DOCUMENTS

| 4,718,294 | 1/1988 | Okoshi | 476/2 X |
| 5,230,670 | 7/1993 | Hibi | 476/42 X |

FOREIGN PATENT DOCUMENTS

63-92859  6/1988  Japan .
2-163562  6/1990  Japan .

*Primary Examiner*—Allan D. Herrmann
*Attorney, Agent, or Firm*—Foley & Lardner

[57] ABSTRACT

In a toroidal stepless transmission having a forward-backward drive change over mechanism between an input shaft and an input disk, an actuator which controls the inclination angles of power roller is controlled by separate controllers according to the drive direction of the vehicle. In order to change over between these two controllers, a spool is provided which displaces in an axial direction between a forward drive position and a backward drive position according to the rotation direction of an output disk. A transfer shaft which rotates in synchronism with the output disk and transfers the output torque to drive shaft of the vehicle, is also used for displacing the spool. A drive gear is fixed to this transfer shaft, and a driven gear to which a rotation force due to engagement with the drive gear and a sliding frictional force in an axial direction are transmitted, is fitted over the spool. Due to the rotation of the drive gear, the driven gear rotates around the spool and simultaneously drives the spool between the forward drive position and the backward drive position due to the sliding frictional force, depending on the rotation direction of the output disk.

4 Claims, 7 Drawing Sheets

TOROIDAL STEPLESS TRANSMISSION

FIELD OF THE INVENTION

This invention relates to a toroidal stepless transmission, and more particularly to a spool valve drive mechanism used for changing over the transmission ratio in a toroidal stepless transmission.

BACKGROUND OF THE INVENTION

A type of stepless transmission, so-called a Trotrak Continuously Variable Transmission, provided with a toroidal groove having a circular cross-section is formed around the common rotation axis of apposite input and output disks, and a plurality of disks referred to as power rollers are held In this groove. The input disk is fixed on a rotation shaft while the output disk is supported such that it is free to rotate around the shaft.

The power rollers come into contact with these input and output disks across the circular cross-section of the toroidal groove, therefore, when the input disks rotate, the power rollers rotate due to friction, and this rotation is transmitted to the output disks by the friction. The rotation speed of the power rollers is faster the greater the distance of the contact point of the input disk from the rotation axis. Further, the rotation speed of the output disk is faster the nearer the contact point of the output disk to the rotation axis. These contact points may be freely changed by modifying the inclination of the power rollers.

The rotation axes of the power rollers are supported at one end of an extensible arm, this extensible arm being supported such that it is free to turn about its own center axis. When this arm is extended, the slant angle of the power rollers varies depending on the circular cross-sectional shape of the toroidal groove.

The transmission ratio may therefore be freely adjusted by controlling an actuator which drives the extensible arm.

In transmissions where a mechanism is provided before the input disks for changing over between forward and backward drive by reversing the rotation direction, the rotation direction of the input disks will be different according to whether the vehicle is driven forward or backward, and the inclination of the power rollers must be adjusted accordingly.

In Tokkai Hei 2-163562 published by the Japanese Patent Office, for example, a mechanism is disclosed wherein the extensible arm is driven by an oil pressure actuator, the oil pressure supplied to the actuator being supplied by different controllers according to whether the vehicle is driven forward or backward.

In this mechanism two oil pressure controllers are selectively connected to the actuator via a spool valve which is displaced in an axial direction between a forward drive position mid a backward drive position. The spool valve is driven via a transfer shaft whose motion is correlated with that of the rotation shaft of the input disk, a collar fitted to the transfer shaft a one-way clutch engaging the transfer shaft with the collar, am arm fixed to the collar which drives the spool valve, and a frictional torque transfer mechanism which transfers a rotational torque within predetermined limits between the collar and the arm.

The one-way clutch rotates freely when the transfer shaft rotates in the forward drive direction, and is locked when the transfer shaft rotates in the backward drive direction. The torque of the transfer shaft is therefore transferred to the collar only when the vehicle is driven backward. The torque transfer mechanism is provided with a sliding surface which slides tinder the action of a torque above a predetermined limit. The spool valve is maintained in the forward drive position by a spring, and when backward driving is desired, the arm which is driven by the collar moves the spool valve to the backward drive position against the force of the spring.

The arm which has driven the spool to the backward drive position does not move any further due to the sliding of the sliding surface of the transfer mechanism, and the spool is therefore held in the backward drive position.

When the transfer shaft changes the rotation direction to forward drive, however, the one-way clutch rotates freely, the arm is released from the rotational torque, and spool drive force is lost. The spool which was pushed by the spring therefore moves to the forward drive position.

In this change-over mechanism, the spool is driven at the end of the arm, and the arm drive torque is supplied from the transfer shaft. The torque transfer mechanism is situated between the base of the arm and the collar, and as the arm is nearer to the transfer shaft than the action point of the force acting oil the spool, the sliding friction of the sliding surface of the torque transfer mechanism must be set at a considerably higher level in order to transfer the torque required by the arm. If this sliding friction is set too high, however, the sliding surface is easily worn down by sliding when the vehicle is driven backward, and durability is poor.

Moreover, this mechanism involves complex structures such as the one-way clutch, and there are too many parts between the transfer shaft and the spool.

Still further, when fitting the spool valve to the transfer mechanism, the arm has to be drawn back so that it is not damaged by the spool, and this rendered the assembly procedure somewhat troublesome.

SUMMARY OF THE INVENTION

It is therefore an object of this invention to reduce wear of the sliding parts used the drive mechanism of the spool valve.

It is a further object of this invention to implement the aforesaid mechanism by means of a simple construction.

It is still a further object of this invention to render the assembly of the aforesaid mechanism easy.

In order to achieve the above objects, this invention provides a toroidal stepless transmission mechanism for a vehicle, comprising an input shaft rotated by a vehicle drive system, an input disk fixed oil the input shaft, a mechanism for changing over the rotation direction of the input shaft, and an output disk supported such that it is free to rotate on the input shaft adjacent to the input disk. The rotation direction of this output disk corresponds to forward or backward drive of the vehicle.

The mechanism further comprises a toroidal groove having a circular cross-section formed on surfaces of the input and output disks surrounding the input shaft, a disk-shaped power roller gripped within the toroidal groove, an actuator for modifying an inclination angle of the power roller, separate control mechanism for controlling the actuator for forward drive and backward drive of the vehicle, a spool which displaces in an axial direction between a forward drive position and a backward drive position for changing over the control means, mid a mechanism for displacing the spool between these positions in accordance with the rotation direction of the output disk.

The displacing mechanism comprises a transfer shaft which rotates in synchronism with the output disk, a drive gear fixed on the drive axis, a driven gear which rotates due to engaging with the transfer gear, and to which a sliding frictional force in the axial direction is also transmitted due to the engaging, and a mechanism for supporting the driven gear on the spool such that an axial displacement of the driven gear is restricted while its rotation is allowed.

Preferably, the displacing mechanism further comprises a mechanism for pushing the spool toward the forward drive position.

Further preferably, the supporting mechanism comprises a spring which supports the driven gear against the frictional force exerted toward the backward drive position, and a member fixed on the spool such that the driven gear is gripped by this member and the spring.

According to another aspect of this invention, the supporting mechanism comprises a friction clutch fixed on the spool having a conical friction surface coaxial with the spool oriented toward the forward drive position and a member fixed on the spool such that the driven gear is gripped by these member and friction surface, and the driven gear having a conical surface which fits over the friction surface.

The details as well as other features and advantages of this invention are set forth the remainder of the specification and are shown in the accompanying drawings.

DESCRIPTION OF THE PREFERRED EMBODIMENTS

Figure 1:
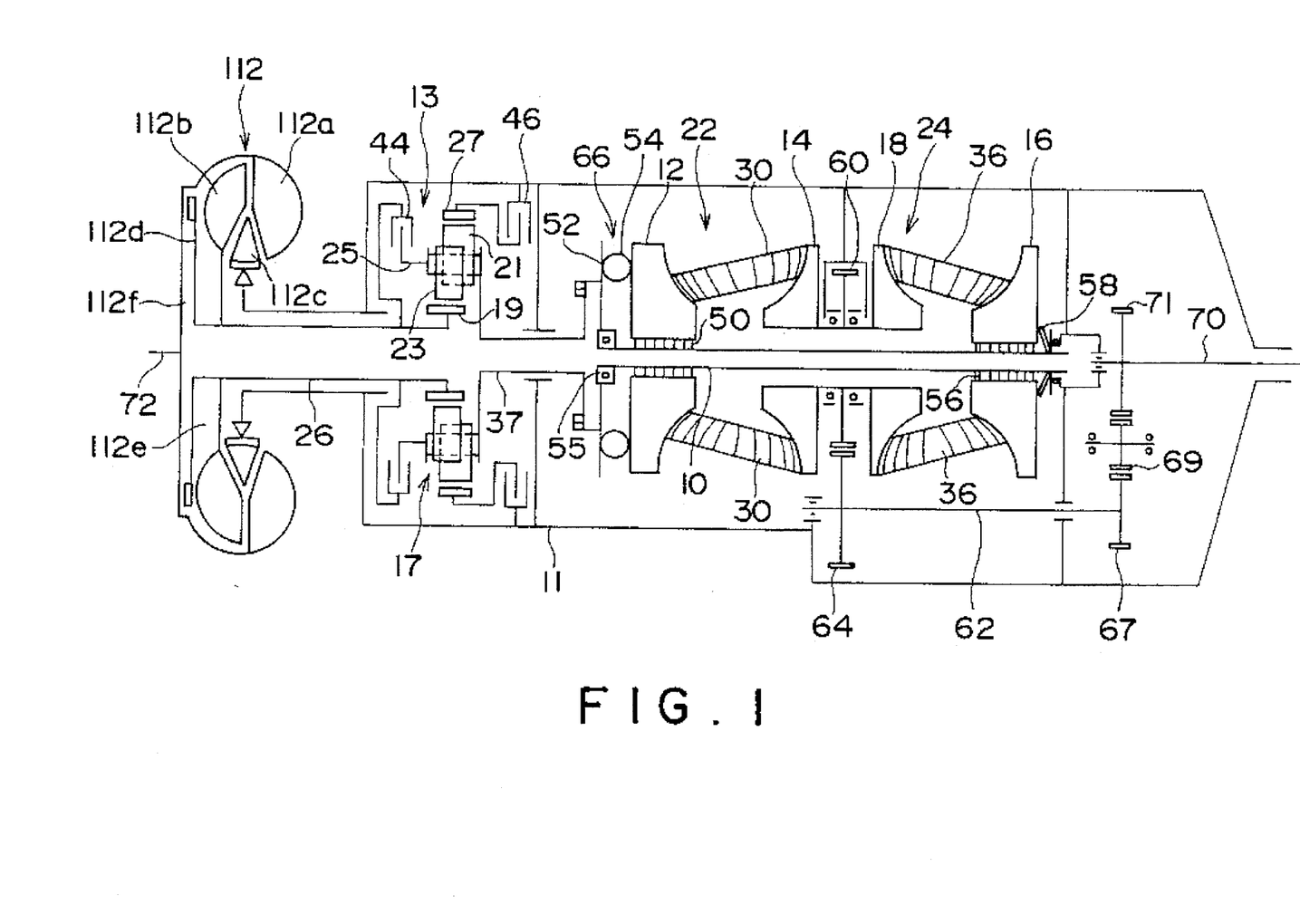
FIG. 1 is a schematic diagram of a stepless transmission according to this invention.

Referring to FIG. 1 of the drawings, a toroidal stepless transmission for a vehicle comprises a torque converter 112, a forward-backward drive change-over mechanism 13, and two sets of toroidal gears 22, 24.

The torque converter 112 comprises a pump impeller 112a which rotates together with the crankshaft 72 of the engine, a turbine liner 112b, a starter 112c and a lock-up clutch 112d.

The lock-up clutch 112d mechanically engages or disengages the pump impeller 112a and the turbine liner 112b according to the oil pressures of an apply side oil chamber 112e and a release side oil chamber 112f. A turbine shaft 26 of the torque converter 112 rotates together with the turbine liner 112b. The forward-backward drive change-over mechanism 13 and toroidal gears 22, 24 are housed in a same housing 11.

The turbine shaft 26 engages with the forward-backward drive change-over mechanism 13. The forward-backward drive change-over mechanism 13 is provided with a planetary gear mechanism 17, forward motion clutch 44 and backward motion brake 46.

The planetary gear mechanism 17 comprises a sun gear 19 which rotates together with the turbine shaft 26, a pinion carrier 25 supporting two pinion gears 21 and 23, and an internal gear 27. The pinion gears 21 and 23 have an identical radius, and engage with each other. The pinion gear 21 engages with the internal gear 27, and the pinion gear 23 engages with the sun gear 19. The pinion carrier 25 is fixed to a transmission shaft 37. The forward motion clutch 44 engages and disengages the pinion carrier 25 and turbine shaft 26. The backward brake 46 clamps the internal gear 27 to the casing 11 when the mechanism is so operated. Therefore, when the forward clutch 44 is engaged and the backward brake 46 is released, a rotation in the same direction as that of the clutch shaft 72 is then transmitted to the transmission shaft 37. When the forward clutch 44 is released and the backward brake 46 is tightened, a rotation in the opposite direction is transmitted to the transmission shaft 37.

A first toroidal gear 22 is situated adjacent to the forward-backward drive change-over mechanism 13, and a second toroidal gear 24 is situated adjacent to the first toroidal gear 22.

The first toroidal gear 22 comprises an input disk 12, output disk 14, and a pair of disk-shaped power rollers 30 which transmit rotation between the input and output disks. The input disk 12 is fixed to an input shaft 10 by means of a ball spline 50, and the output disk 14 is supported such that it is free to rotate on the output shaft 10. A toroidal groove is formed around the input shaft 10 on apposite surfaces of the input disk 12 and output disk 14. This toroidal groove has a circular cross-section, and the power rollers 30 are gripped between and in contact with the input disk 12 and the output disk 14 forming side walls of the toroidal groove.

On the opposite side to the toroidal groove, the input disk 12 is supported by a supporting unit 66. The supporting unit 66 supports the input disk 12 such that it is free to turn by means of a flange 52 and roller 54 which are themselves supported on the input shaft 10 by a thrust bearing 55 such that they are free to rotate relative to the shaft 10. This unit 66 also exerts an axial force on the input disk 12 according to the rotation speed of the input disk 12.

The second toroidal gear 24 is provided with an input disk 16, output disk 18 and power rollers 36. The construction of these parts is the same as that of the parts of the first toroidal gear 22, however, they are arranged in am opposite orientation to that of the first toroidal gear 22, the output disk 18 being supported adjacent to the output disk 14 such that it is free to rotate on the input shaft 10. The input disk 16 is fixed on the input shaft 10 by a ball spline 56.

A disc spring 58 is interposed between the input disc 16 and the casing 11 supporting the input shaft 10. A force in the axial direction generated in the supporting unit 66 therefore acts oil the input disk 12, and also acts on the input disk 16 from the opposite direction via the input shaft 10 and disc spring 58. The power rollers 30, 36 are therefore gripped elastically between the input disks 12, 16 and output disks 14, 18 in both the first and second toroidal gears 22 and 24.

The output discs 14, 18 are spline jointed to all output gear 60 which is supported free to rotate on the input shaft 10. The output gear 60 engages with an input gear 64 linked to the end of a transfer shaft 62 arranged inside the casing 11 parallel to the input shaft 10, and the rotation of the input shaft 10 is thereby transmitted to the transfer shaft 62. A gear 67 is linked to the other end of the transfer shaft 62. An idle gear 69 engages with the gear 67, and a gear 71 fixed to the output shaft 70 engages with the idle gear 69. The rotation of the output disks 14, 18 is thereby transmitted to the output shaft 70. This output shaft 70 drives the wheels of the vehicle.

Figure 3:
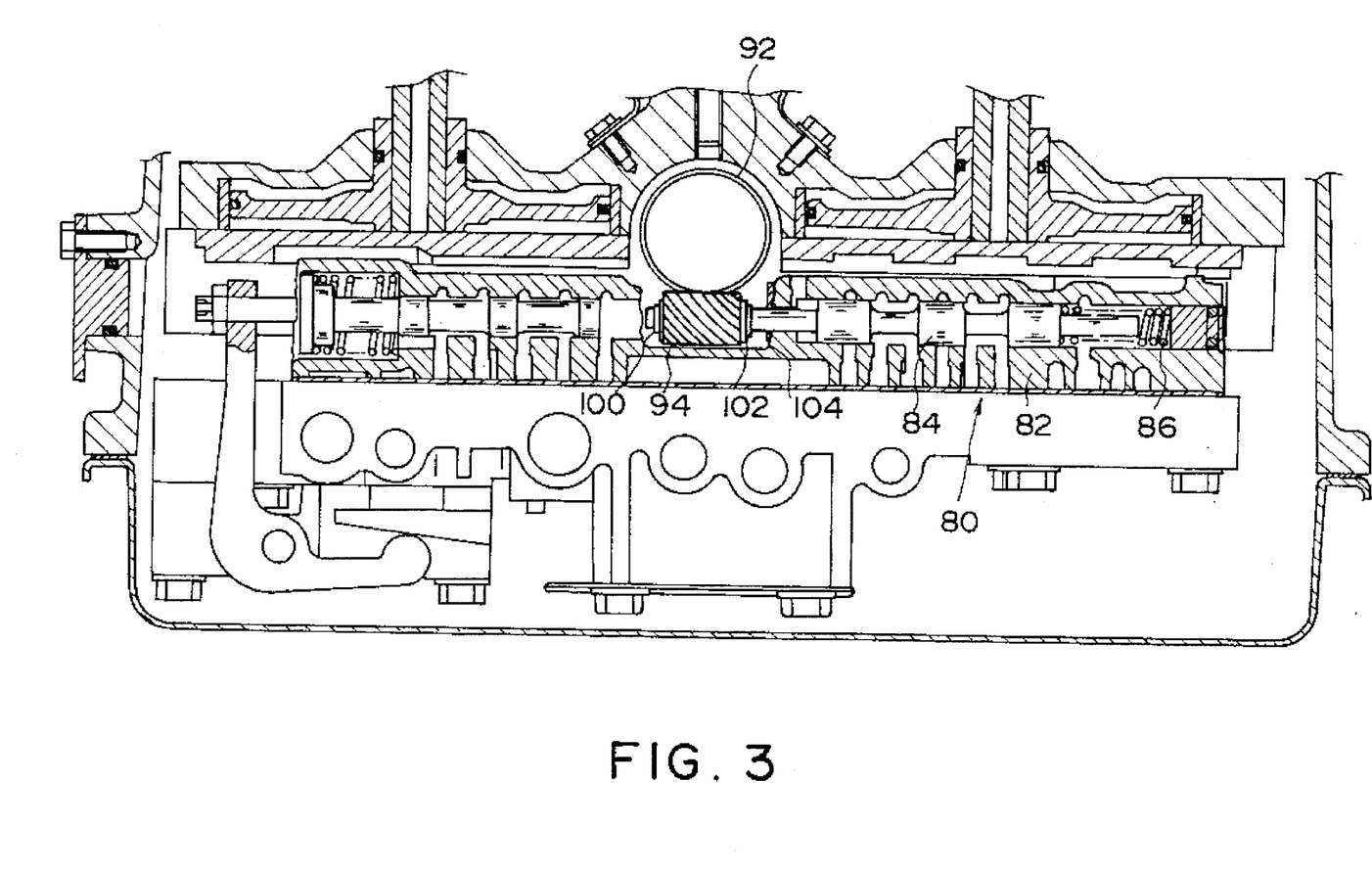
FIG. 3 is a sectional view of all essential part of the stepless transmission taken along a center axis of spool according to this invention.

The pair of power rollers 30 (36) is arranged in symmetrical positions about the input shaft 10. The inclination angles of the power rollers 30 (36) are varied via control valves mid hydraulic actuators, not shown, the rotation of the input disk 12 (16) being varied in a stepless fashion so as to be transmitted to the output disk 14 (18). The constructions of these control valves and hydraulic actuators are disclosed in the aforesaid Tokkai Hei 2-163562 and in Jikkai Sho 63-92859 published by the Japanese Patent Office, working oil being supplied to the actuators via separate control valves provided for forward drive and backward drive of the vehicle. A spool valve 80 is provided in the casing 11, as shown in FIG. 3, in order to change over these control valves when the vehicle is driven forward or backward.

Figure 5:
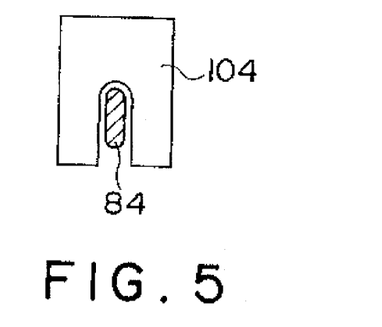
FIG. 5 is a horizontal sectional view of the spool and a rotation stop plate according to this invention, taken along a line V—V in FIG. 4.

The spool valve 80 comprises a spool 84 which displaces in the axial direction between the forward drive and backward drive positions, oil being supplied to one of the control valves from a pump, not shown, according to the position of the spool 84. The spool 84 is free to slide on the inner surface of a sleeve 82 prodded in the casing 11, and its base is supported by a spring 86. The spool 84 is thereby pushed in the axial direction so that its tip portion having a smaller diameter projects outside the sleeve 82. The spool 84 is oriented at right angles to the transfer shaft 62. The base of the tip portion has an elliptical cross section as shown in FIG. 5, a stop plate 104 with a notch that fits over the outer circumference of the spool 84 being fixed on the opening of the sleeve 82 from which the spool 84 projects, in order to limit the rotation of the spool 84.

Figure 2:
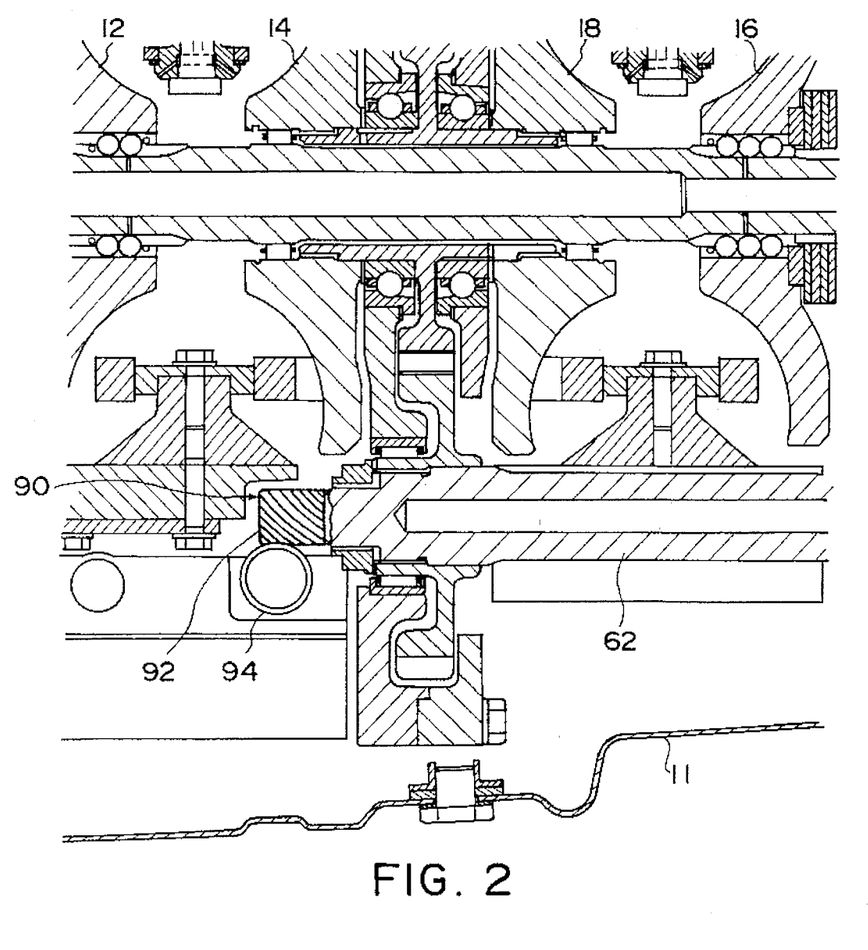
FIG. 2 is a sectional view of all essential part of the stepless transmission taken along a transfer shaft axis according to this invention.

According to this invention, as shown in FIG. 2, a transfer mechanism 90 is used to displace the spool 84 in its axial direction between the forward drive and backward drive positions in accordance with the drive direction of the vehicle.

The transfer mechanism 90 is provided with a drive gear 92 formed at an end of the transfer shalt 62. The drive gear 92 has helical teeth and engages with a driven gear 94 attached to the tip portion of the spool 84.

Figure 4:
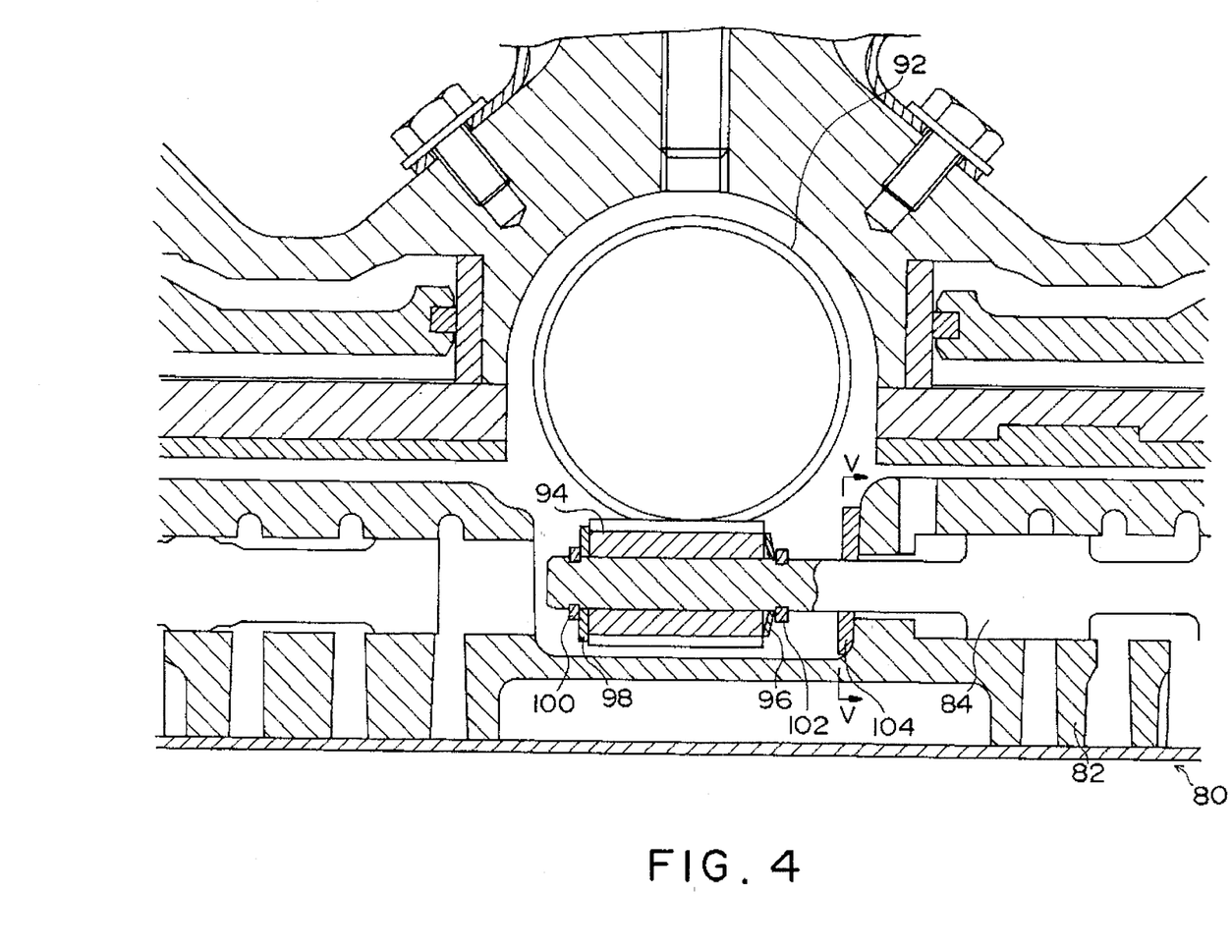
FIG. 4 is an enlarged view of a part of FIG. 3.

As shown in FIG. 4, the driven gear 94 fits over the outer circumference of the spool tip portion, its displacement in the axial direction toward the end of the tip portion being restricted by a snap ring 100 attached to the spool 84 via a washer 98. Its base is also supported elastically by a disc spring 96 and a snap ring 102. The driven gear 94 is thereby gripped elastically by the disc spring 96 and washer 98.

The driven gear 94 rotates around the spool 84 due to a vertical force acting on the teeth engaging with those of the drive gear 92, and is also pushed in the axial direction by a frictional force acting on the teeth in a perpendicular direction.

When the vehicle is driven backward, the drive gear 92 rotates in an anticlockwise direction of FIG. 3 according to the rotation of the transfer shaft 62 in the backward drive direction, and this rotates the driven gear 94. A frictional force proportional to the vertical force of the teeth is then produced in the engagement area of the drive gear 92 and driven gear 94, and this frictional force presses the driven gear 94 toward the right of FIG. 3. A force in the axial direction then acts on the spool 84 via the disc spring 96 and washer 102, and the spool 84 moves to the right of the figure against the force of the spring 86.

When the washer 102 comes into contact with the stop plate 104, any further displacement of the spool 84 is prevented. This position is the backward drive position of the spool 84.

Provided that the backward drive rotation of the transfer shaft 62 continues, the driven gear 94 continues to rotate due to the drive gear 92, and the driven gear 94 continues to be pressed against the stop plate 104 due to the friction of the teeth. The driven gear 94, whereof any further displacement in the axial direction is prevented by the stop plate 104, is then maintained in the backward drive position by rotating while sliding against the teeth of the drive gear 92.

When the vehicle is driven forward, on the other hand, the drive gear 92 rotates in the clockwise direction of FIG. 3 due to the rotation of the transfer shaft 62 in the forward drive direction, and the driven gear 94 rotates in the opposite direction to the case of backward drive. The frictional force of the teeth then acts on the driven gear 94 in the opposite direction to the case of backward drive so that the spool projection from the sleeve increases, and as the spool 84 is pushed in the same direction by the spring 86, the spool 84 immediately moves to the forward drive position where a step formed on the spool is in contact with the sleeve end. In this position, any further displacement of the spool 84 is prevented. The rotation of the driven gear 94 by the drive gear 92 continues, and sliding friction between the teeth surfaces of the gears is produced.

The deformation of the disc spring 96 is different in the forward drive position and backward drive position, the spring load being the smallest in the forward drive position. The frictional resistance between the disc spring 96, driven gear 94 and washer 98 is then at its lowest, mid as the rotational resistance of the driven gear 94 is a minimum, the sliding frictional force based on this resistance is also a minimum. Hence, by maintaining the driven gear 94 in this position during the time when the vehicle is driven forward, which is much longer than the time for which the vehicle is driven backward, wear between the teeth of the drive gear 92 and those of the driven gear 94 is suppressed to a minimum.

When the vehicle is driven backward, the rotational resistance of the driven gear 94 is larger than when the vehicle is driven forward due to compression of the disc spring 96. Further, to move or retain the spool 84 in its backward drive position against the load of the spring 86, a large drive force in the axial direction is required. The frictional force acting between the teeth of the drive gear 92 and driven gear 94 then increases in comparison to what it is when the vehicle is driven forward; however, as the time proportion for which the vehicle is driven backward is far less than the time for which it is driven forward, there is no risk of wear between the teeth of the drive gear 92 and those of the driven gear 94 due to friction when the vehicle is driven backward.

In the aforesaid prior art mechanism, am arm is used to drive the spool, and as the area where sliding friction is produced is nearer the drive axis than the action point of the force, the set frictional force in this area must be larger than the force required at the action point.

However, in the drive mechanism of this invention, sliding friction is produced at the point where the transfer shaft 62 exerts a force on the spool 84. There is therefore no need to increase friction, and the frictional force between the drive gear 92 and driven gear 94 can be set lower than that of the frictional parts of the prior art mechanism. Further, as no arm is used, there is no noise due to the arm striking the edge of the spool, and operational noise is reduced.

Moreover, there is no need for the driven gear 94 to transmit rotational force, and if a large backlash is provided between the drive gear 92 and driven gear 94, assembly of these parts is rendered easier.

Figure 6:
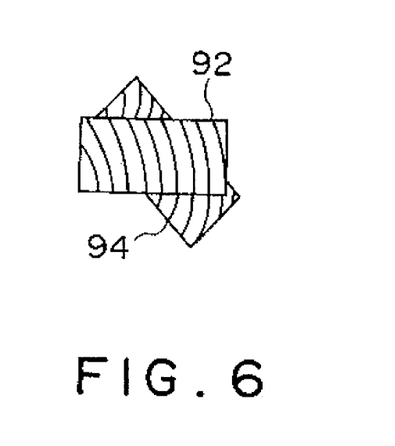
FIG. 6 is a schematic diagram showing another layout of a drive gear and driven gear according to this invention.
Figure 7:
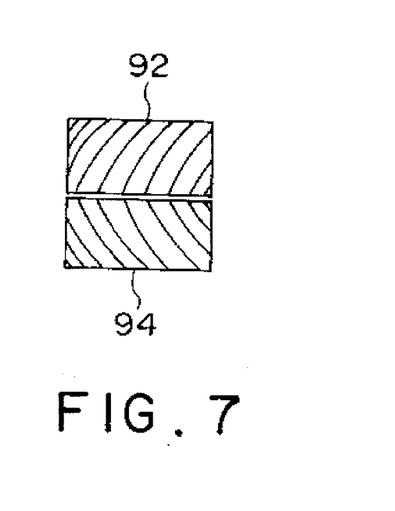
FIG. 7 is a schematic diagram showing yet another layout of the drive gear and driven gear.

In the aforesaid embodiment, the drive gear 92 and driven gear 94 are arranged such that they are in contact with one another at right angles, however the contact angle may be set to be an angle different from a right angle by modifying the shape of the gear teeth as shown in FIG. 6 and FIG. 7. Any structure is acceptable provided that sliding friction is produced between the drive gear 92 and driven gear 94 in the axial direction due to rotation of the drive gear 92.

Figure 8:
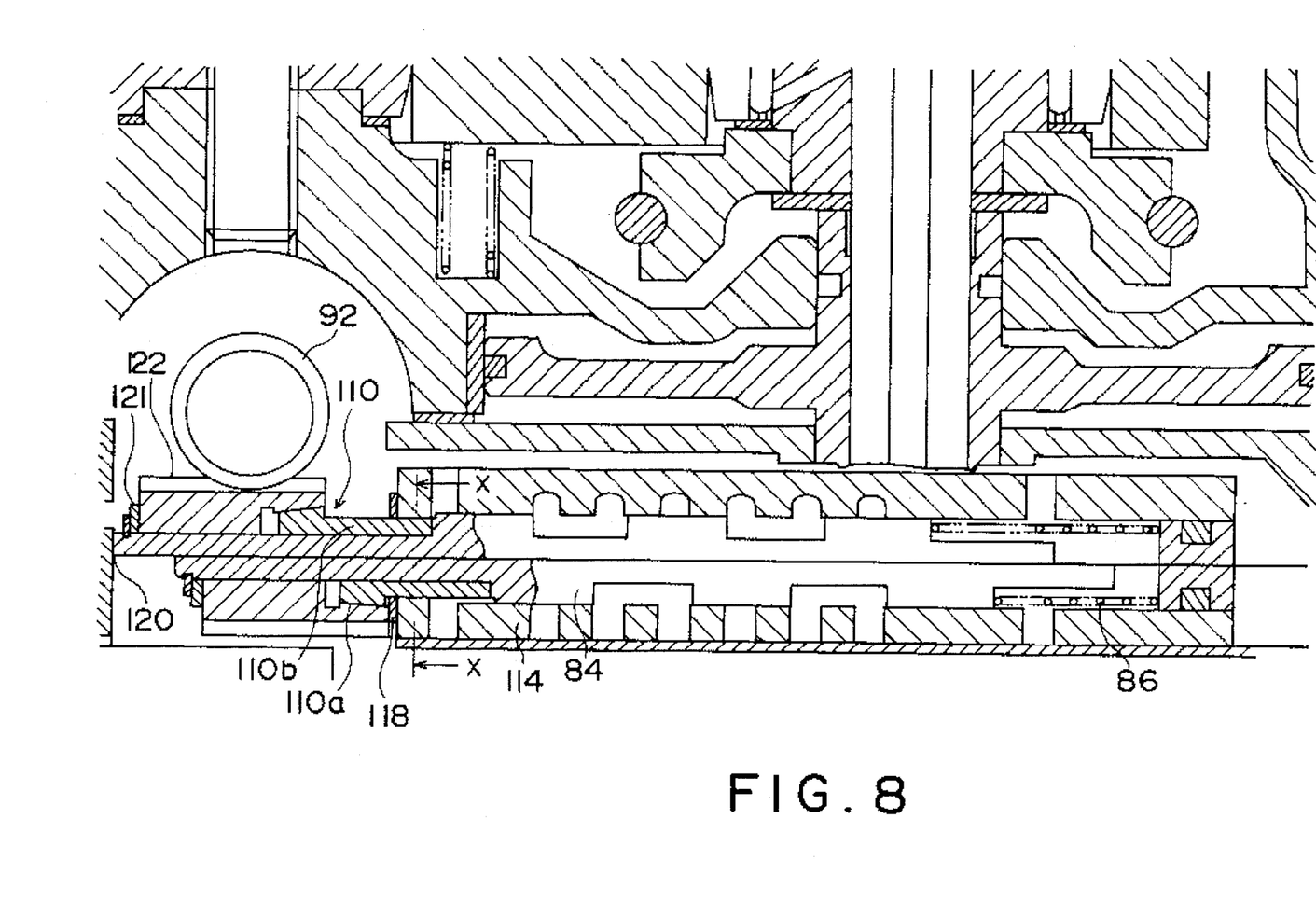
FIG. 8 is similar to FIG. 4, but showing a second embodiment of this invention.
Figure 9:
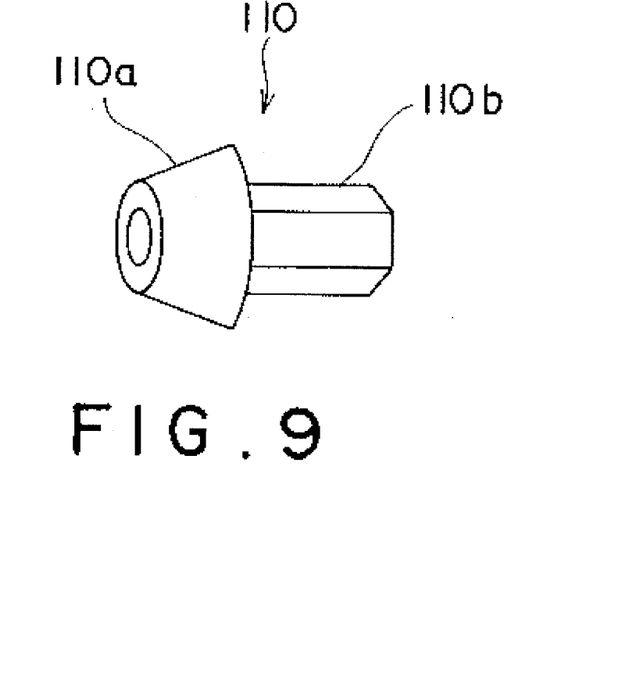
FIG. 9 is an perspective view of a taper clutch according to the second embodiment of this invention.
Figure 10:
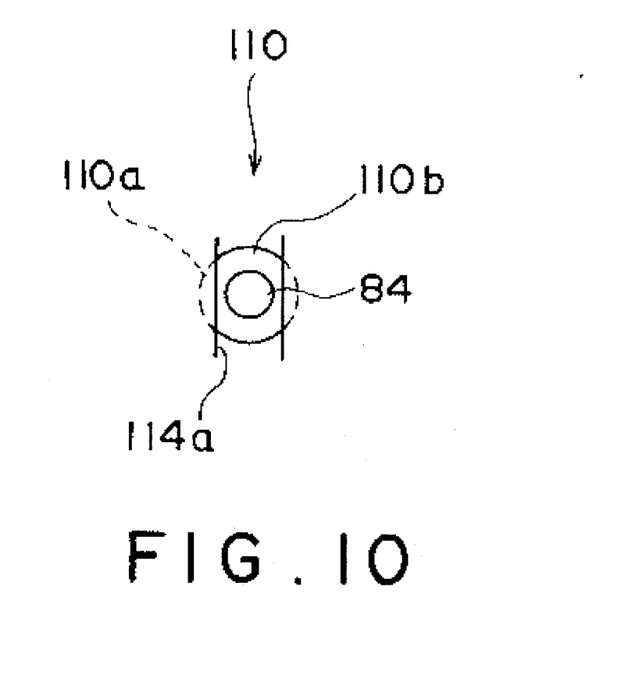
FIG. 10 is a sectional view of the taper clutch and a valve body end according to the second embodiment of this invention, taken along a line X—X of FIG. 8.

FIGS. 8–10 show another embodiment of this invention.

According to this second embodiment, a taper-shaped friction clutch 110 is used instead of the disc spring 96 and the washer 102. The clutch 110 has a conical surface 110a of large radius at the tip of a shaft 110b as shown in FIG. 9, this surface fitting over the outer circumference of the spool 84. The shaft 110b has a circular cross-section wherein the circle is truncated oil opposite sides so as to form two parallel straight edges. These edges slide in contact with a slit 114a formed at the outlet of the sleeve 114, thereby restricting the rotation of the shaft 110b and permitting only displacement the axial direction. At the outlet of the sleeve 114 there is further provided a stopper 118 having a slit of identical shape to the slit 114a.

A driven gear 122 fits over the outer circumference of the tip portion of the spool 84 which passes through the clutch 110. The driven gear 122 has a recess provided with a conical surface which slides over the conical surface 110a of the clutch 110, the driven gear 122 being gripped between the conical surface 110a and a washer 121. The end of the tip portion of the spool 84 passes through the driven gear 122, and a stopper 120 is provided inside the casing 11 in an apposite position to this tip portion end. The shaft 110b of the clutch 110 is longer than the stroke distance of the spool 84. The spool 84 therefore moves in the axial direction between a forward drive position wherein its end comes into contact with the stopper 120, and a backward drive position wherein the step between the conical surface 110a of the clutch 110 and the shaft 110b, comes into contact with the stopper 118 fitted on the sleeve opening. The remainder of the construction is identical to that of the first embodiment hereintofore described.

When the vehicle is driven backward, the drive gear 92 rotates in the anticlockwise direction of FIG. 8 as in the first embodiment, the driven gear 122 rotates around the spool 84 mid a frictional force acts on the teeth of the driven gear 122. Due to this frictional force, the spool 84 is displaced via the clutch 110 in the axial direction toward its backward drive position against the force of the spring 86. At the backward drive position, the step between the conical surface 110a and the shaft 110b of the clutch 110 comes into contact with the stopper 118 and further displacement of the spool 84 is thereby restricted.

A force in the axial direction depending on the slack in the spring 86 acts between the recess of the driven gear 122 and the conical surface 110a of the clutch 110, and the driven gear 122 therefore rotates against the sliding friction produced in this contact surface. The spool 84 is held in its backward drive position by the frictional force of the teeth while the vehicle is driven backward.

When the vehicle driven forward, the driven gear 122 rotates in the opposite direction to the case of backward drive due to the rotation of the drive gear 92 in the clockwise direction of the figure, and the spool 84 is displaced hi a direction tending to move it off the sleeve 114 by the frictional force acting on the teeth of the driven gear 122. This displacement stops in the forward drive position when the end of the spool 84 comes into contact with the stopper 120. The drive gear 92 then pushes the driven gear 122 in the same direction, and the spool 84 is held in the forward drive position while the vehicle is driven forward. In this position, as the spring 86 is elongated, the axial force acting on the spool 84 is small, and the frictional force between the recess of the driven gear 122 and the conical surface 110b of the clutch 110 is also small. There is therefore little resistance to rotation of the driven gear 122, and the sliding friction produced between the teeth of the drive gear 92 and driven gear 122 is small.

According to this embodiment also, friction generated during the time when the vehicle is driven forward is small, and as this time is much longer than the time during which the vehicle is driven backward, wear of parts is minimized.

Instead of providing the stopper 120 for limiting the displacement of the spool 84, it may be limited also by providing steps on the spool 84 which come into contact with the end of the sleeve.

The embodiments of this invention in which an exclusive property or privilege is claimed are defined as follows:

1. A toroidal stepless transmission mechanism for a vehicle, comprising an input shaft rotated by a vehicle drive system, an input disk fixed on said input shaft, means for changing over the rotation direction of said input shaft, an output disk supported such that it is free to rotate on said input shaft adjacent to said input disk, the rotation direction of said output disk corresponding to forward or backward drive of the vehicle, a toroidal groove having a circular cross-section formed on surfaces of these disks surrounding said input shaft, a disk-shaped power roller gripped within said toroidal groove, an actuator for modifying an inclination angle of said power roller, separate control means for controlling said actuator for forward drive and backward drive of the vehicle, a spool which displaces in an axial direction between a forward drive position and a backward drive position for changing over said control means, and means for displacing said spool between said positions in accordance with the rotation direction of said output disk, characterized in that said displacing means comprises:

a transfer shaft which rotates in synchronism with said output disk, a drive gear fixed on said transfer shaft, a driven gear which rotates due to engaging with said drive gear and to which a sliding frictional force in the axial direction is also transmitted due to said engaging, and means for supporting said driven gear on said spool such that an axial displacement of said driven gear is restricted while its rotation is allowed.

2. A toroidal stepless transmission mechanism as defined in claim 1, wherein said displacing means further comprises means for pushing said spool toward the forward drive position.

3. A toroidal stepless transmission mechanism as defined in claim 2, wherein said supporting means comprises a spring which supports said driven gear against said frictional force exerted toward the backward drive position, and a member fixed on said spool such that said driven gear is gripped by said member and said spring.

4. A toroidal stepless transmission mechanism as defined in claim 2, wherein said supporting means comprises a friction clutch fixed on said spool having a conical friction surface coaxial with said spool oriented toward said forward drive position and a member fixed on said spool such that said driven gear is gripped by said member and said friction surface, and said driven gear having a conical surface which fits over said friction surface.

* * * * *